July 14, 1936.  W. P. DAY  2,047,358
CAR WHEEL
Filed June 1, 1931  3 Sheets-Sheet 2

Inventor
William P. Day
By Hull, Brock & West
Attorney.

July 14, 1936.     W. P. DAY     2,047,358
CAR WHEEL
Filed June 1, 1931     3 Sheets-Sheet 3

INVENTOR
William P. Day
BY Hull, Brock & Weah
ATTORNEY

Patented July 14, 1936

2,047,358

UNITED STATES PATENT OFFICE 2,047,358

CAR WHEEL

William P. Day, Cleveland, Ohio, assignor of one-fourth to John J. Day and one-fourth to William P. Day, Jr.

Application June 1, 1931, Serial No. 541,325

3 Claims. (Cl. 295—12)

This invention relates generally to car wheels and more particularly to car wheels for street cars and interurban cars, although the invention is applicable to car wheels of any size.

The main object of the invention is to provide a car wheel of the character described which is simple in construction and comprises few parts which are well adapted for production at a low cost.

Another object of the invention is to provide a resilient car wheel which tends to reduce noise and which provides a cushion between the wheel rim and the wheel proper.

A further object of the invention is to provide a car wheel in which the rim portion is resiliently mounted with respect to the wheel body and in which pneumatic means are provided to cushion the wheel.

A still further object of the invention is to provide a car wheel which consists essentially of a body portion and a rim portion between which a pneumatic tube is disposed and which is readily removable for replacement or repair.

Figure 1:
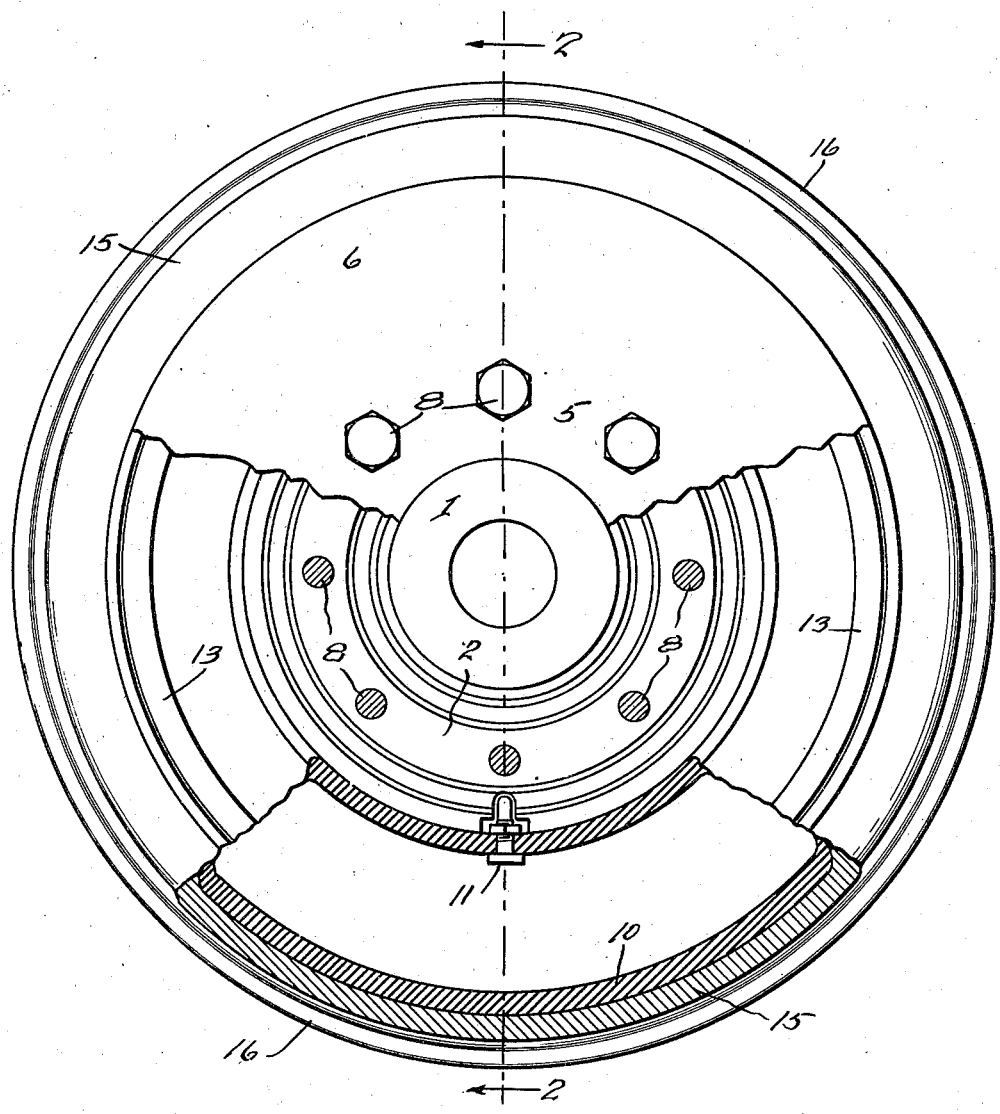
Figure 2:
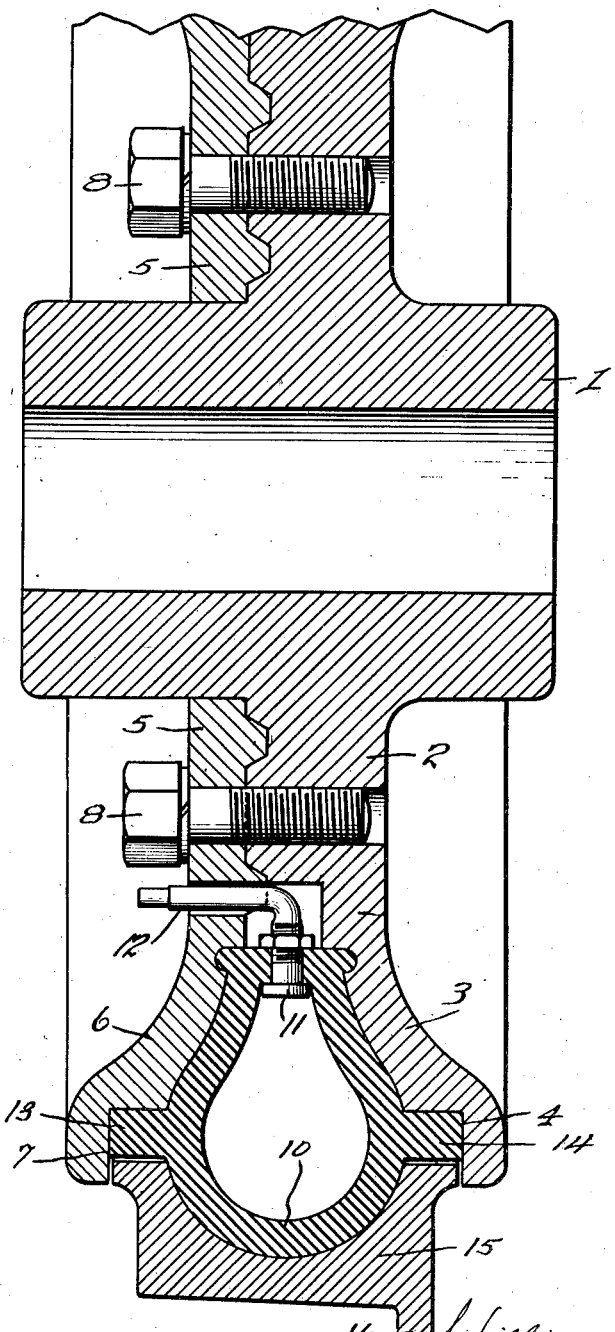

Further and more limited objects of the invention will appear as the description proceeds and by reference to the accompanying drawings in which Fig. 1 is a view in front elevation of a wheel illustrating the preferred embodiment of my invention and in which parts are broken away to more clearly illustrate the details of construction, and Fig. 2 is a vertical sectional view on the line 2—2 of Fig. 1.

Referring now to the drawings, the wheel consists essentially of a body portion formed of aluminum steel or other suitable material and having a hub 1 and a radially extending flange 2 which is flared outwardly at its periphery as shown at 3 and provided with an annular peripheral shoulder 4. Fitting over the hub portion 1 and secured to the flange 2 is a disk 5 which flares outwardly toward its periphery as shown at 6 and is provided with an annular peripheral shoulder 7. The disk 5 is secured to the flange 2 by means of studs 8. Due to the fact that the flanges 2 and 5 are flared outwardly at the periphery thereof, a pocket or chamber is formed therebetween which is adapted to receive therein a pneumatic tube or bag 10 having a valve 11 therein from which leads a connection 12 through which the tube may be inflated. The tube 10 is preferably formed of rubber and extending along opposite sides thereof are a pair of shoulders or flanges 13 and 14 which fit into the space provided between the shoulders 4 and 7. Also extending about the periphery of the wheel body is a rim 15 which is of such size as to fit between the shoulders 4 and 7 as shown most clearly in Fig. 2. The rim is formed of any suitable material and is preferably made in one piece. The rim fits loosely between the shoulders 4 and 7 and bears against the air bag 10 and the shoulders or flanges 13 and 14. The rim is provided with the usual rail flange 16 which is adapted to engage one edge of the rails. Pressure of the air bag against the rim is sufficient to hold the rim against rotation with respect to the wheel body. The pneumatic cushion between the rim and the wheel body, in addition to reducing the noise, also permits the rim to adapt itself to the irregularities in the rails and thus reduces the wear on the rails and special work, such as frogs and crossings. In electrical railway cars suitable means are provided for electrically connecting the rim and wheel body.

While I have disclosed the bag or tube 10 as being a single bag, it is of course understood that a double tube or bag may be provided, such as used in automobile tires.

When it is desired to remove the bag for the purpose of replacement or repair, the disk 5 is removed, which will permit the rim 15 to be removed to provide access to the bag.

Figure 3:
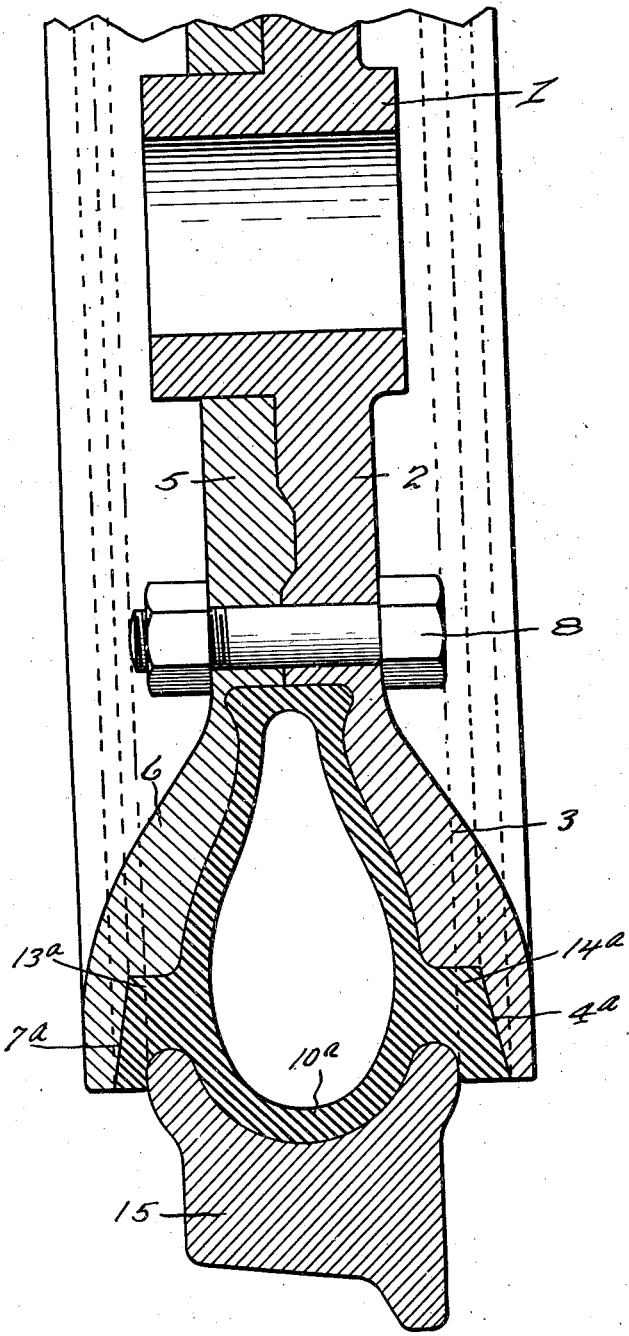

In Fig. 3 there is disclosed a slightly modified form of my invention which is identical with the form of the invention shown in Figs. 1 and 2 except that the shoulders 4ª and 7ª are spaced apart a considerable distance and the air bag 10ª is somewhat different in shape and provided with shoulders or flanges 13ª and 14ª which are somewhat enlarged and different in shape. The rim 15ª is also shaped to conform to the air bag and provided with a depressed portion adapted to receive the air bag therein. The inner peripheral portions of the rim are also slightly spaced from the shoulders 4ª and 7ª so as to be maintained out of contact with the body portion of the wheel. In other respects this form of the invention is identical with that shown in Figs. 1 and 2. This form of the invention is especially adapted for use in subway cars and elevated railway cars where the reduction of noise is of prime importance. In this form of the invention should the air bag become punctured or deflated the rim cannot contact with the metal edges of the wheel body. Another advantage of this form of the invention is that the rim can be made out of harder steel than is now considered desirable thus providing for longer wear.

It will now be clear that I have provided a car wheel of the character described which will accomplish the objects of the invention as hereinbefore stated. It is to be understood that the embodiment of the invention herein disclosed is merely illustrative and is not to be considered in a limiting sense, as various changes may be made in the details of construction without departing from the spirit of my invention. The invention is therefore limited only in accordance with the scope of the appended claims.

Having thus described my invention, what I claim is:

1. A car wheel comprising a body portion having a hub and a radially extending flange the outer edge of which is flared outwardly and shaped to provide an annular shoulder, a disk secured to said flange and having its outer edge flared outwardly and shaped to provide an annular shoulder which is disposed opposite said first mentioned annular shoulder, a pneumatic tube disposed between said shoulders, a rim bearing against said tube and fitting between said annular shoulders, said pneumatic tube having a pair of annular shoulders thereon extending along opposite sides thereof and disposed between said rim and body portion.

2. A car wheel comprising a body portion having a hub and a radially extending flange the outer edge of which is flared outwardly and shaped to provide an annular shoulder, a disk secured to said flange and having its outer edge flared outwardly and shaped to provide an annular shoulder which is disposed opposite said first mentioned annular shoulder, a pneumatic tube disposed between said shoulders, a rim bearing against said tube and fitting between said annular shoulders, said pneumatic tube having a pair of annular shoulders thereon extending along opposite sides thereof and disposed between said rim and body portion, said pair of annular shoulders having a resilient flange along their entire periphery, so constructed to fit between the annular shoulders of the radially extending flange and said rim.

3. A car wheel comprising a body portion having a hub and a radially extending flange the outer edge of which is flared outwardly and shaped to provide an annular shoulder, a disk secured to said flange and having its outer edge flared outwardly and shaped to provide an annular shoulder which is disposed opposite said first mentioned annular shoulder, a pneumatic tube disposed between said shoulders, a rim bearing against said tube and fitting between said annular shoulders, said pneumatic tube having a pair of annular shoulders thereon extending along opposite sides thereof and disposed between said rim and body portion, and means for inflating said pneumatic tube.

WILLIAM P. DAY.